United States Patent
Pflieger et al.

(10) Patent No.: US 7,220,843 B2
(45) Date of Patent: May 22, 2007

(54) METHANESULFONAMIDE AZO DYES

(75) Inventors: Dominique Pflieger, Tagsdorf (FR); Hans Joachim Metz, Darmstadt (DE)

(73) Assignee: Clariant Produkte (Deutschland) GmbH, Sulzbach (DE)

(*) Notice: Subject to any disclaimer, the term of this patent is extended or adjusted under 35 U.S.C. 154(b) by 46 days.

(21) Appl. No.: 10/552,602

(22) PCT Filed: Mar. 31, 2004

(86) PCT No.: PCT/EP2004/003380

§ 371 (c)(1), (2), (4) Date: Oct. 7, 2005

(87) PCT Pub. No.: WO2004/090045

PCT Pub. Date: Oct. 21, 2004

(65) Prior Publication Data

US 2006/0286477 A1 Dec. 21, 2006

(30) Foreign Application Priority Data

Apr. 10, 2003 (DE) ................. 103 16 402

(51) Int. Cl.
- C09B 45/14 (2006.01)
- C09B 45/24 (2006.01)
- C09D 11/02 (2006.01)
- G03G 9/09 (2006.01)

(52) U.S. Cl. ............... 534/712; 534/714; 534/716; 534/723; 534/763; 534/783; 534/827; 534/876; 8/674; 8/681; 8/682; 8/685; 8/686; 8/918; 8/921; 106/31.5; 106/31.51; 106/31.52; 430/108.23; 524/105; 524/159

(58) Field of Classification Search ........... 534/712, 534/714, 716, 723, 763, 783, 827, 876; 8/674, 8/681, 682, 685, 686, 918, 921; 106/31.5, 106/31.51, 31.52; 430/108.23; 524/105, 524/159

See application file for complete search history.

(56) References Cited

U.S. PATENT DOCUMENTS

| | | | |
|---|---|---|---|
| 3,132,130 A | * | 5/1964 | Beffa et al. ............ 534/700 |
| 6,127,531 A | | 10/2000 | Nusser |
| 6,635,747 B2 | | 10/2003 | Wight et al. |
| 2001/0027734 A1 | | 10/2001 | Geisenberger et al. |

OTHER PUBLICATIONS

PCT International Search Report for PCT/EP2004/003380, mailed Aug. 10, 2004.

English Translation of International Preliminary Examination Report for PCT/EP2004/003380, mailed Mar. 9, 2006.

* cited by examiner

Primary Examiner—Fiona T. Powers
(74) Attorney, Agent, or Firm—Anthony A. Bisulca

(57) ABSTRACT

This invention relates to monoazo, disazo and trisazo colorants of the formula (I)

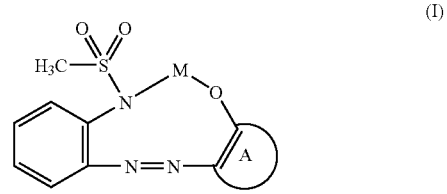

where
M represents two hydrogen atoms or one metal ion selected from the group consisting of Cu, Co, Ni, Mn, Zn and Al;
A is the radical of a substituted naphthyl or pyrazolyl radical.

14 Claims, No Drawings

METHANESULFONAMIDE AZO DYES

The present invention describes novel methanesulfonamido-containing azo dyes, processes for their preparation and their use in recording fluids, especially for the inkjet printing process.

The inkjet process is a non-impact printing process, which generally speaking exists in two forms. Drop-On-Demand and Continuous Stream. The Drop-On-Demand principle is that the ink in the form of a droplet from a nozzle is placed in the right place at the right time under electronic control, whereas in Continuous Stream the ink issues continuously and then either impinges on the receiving medium (eg paper), likewise after electronic charging, or is deflected into a collecting vessel. To obtain prints of high definition and resolution, the recording fluids and dyes present in them have to meet very stringent requirements, especially with regard to lightfastness and waterfastness. High lightfastness is very important especially for inkjet applications outdoors and in the production of inkjet prints of photographic quality.

The most important part in all this is played by the dyes used in the inks. Although a large number of dyes have been developed, there are only a few which meet the requirements of a modern inkjet printing process.

One group of chromium complex dyes do possess high lightfastness, but the chromium content is ecologically unacceptable.

There is accordingly a need for improved colorants which are ecologically safe and which are notable for high solubility in water and/or organic solvents and have good ozone- and lightfastnesses, high color strength and brilliance.

It has been found that certain methanesulfonamido-containing azo dyes achieve this object.

The present invention accordingly provides compounds of the general formula (I)

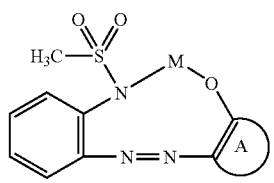

(I)

where
M represents two hydrogen atoms or one metal ion selected from the group consisting of Cu, Co, Ni, Mn, Zn and Al;
A is

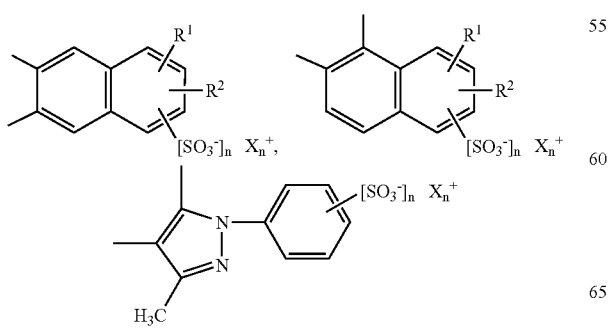

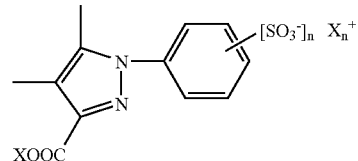

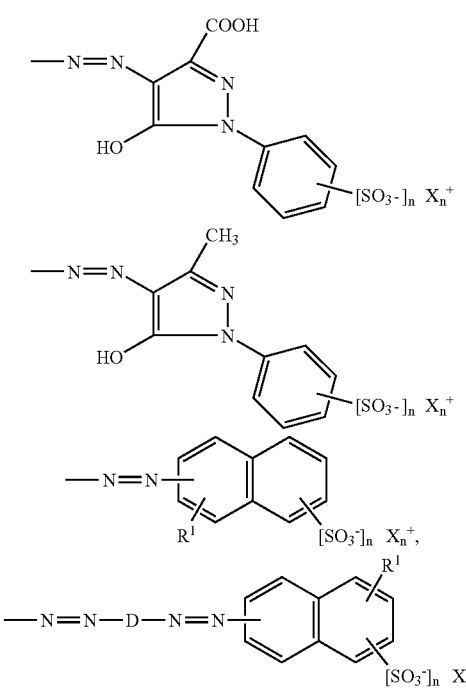

$R^1$ is H, OH or —NH—$(CH_2)_a$—$SO_3^-X^+$ where a is from 1 to 6, and preferably 2, 3, or 4;
$R^2$ is H or a radical of the formulae D is $C_6H_4$, $C_6H_3(OH)$ or $C_6H_3(OCH_3)$;
X is H, alkali metal, preferably Na or K; $NH_4$, $C_1$–$C_{18}$-alkyl-$NH_3$, ($C_1$–$C_{18}$-alkyl)$_2NH_2$, ($C_1$–$C_{18}$-alkyl)$_3NH$, ($C_1$–$C_{18}$-alkyl)$_3CNH_3$, ($C_1$–$C_{18}$-alkyl)$_2CHNH_3$, or ($C_1$–$C_{18}$-alkyl)$_4N$, and
n is from 1 to 4 and preferably 1 or 2.

Preference is given to compounds of the formula (I) where M represents two hydrogen atoms (metal-free compound) or Cu.

Particular preference is given to monoazo compounds of the formulae (IIa) to (IIf)

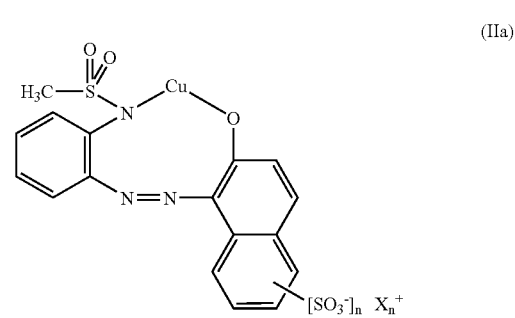

(IIa)

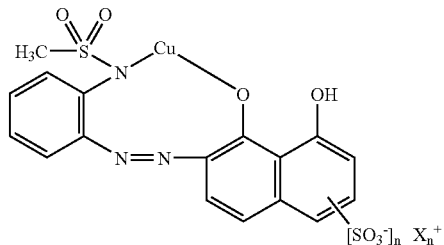
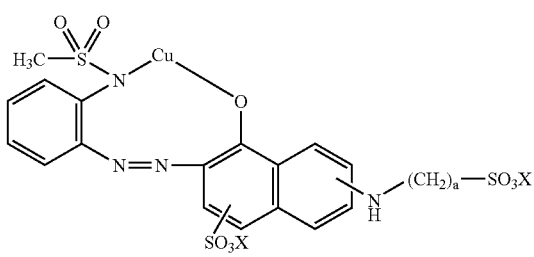
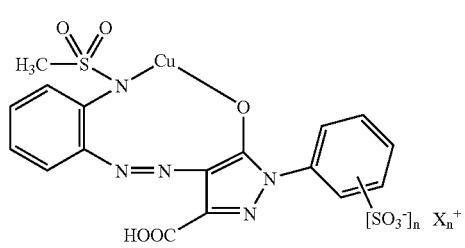
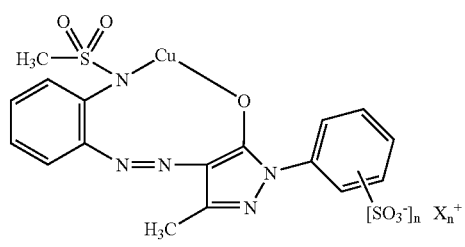
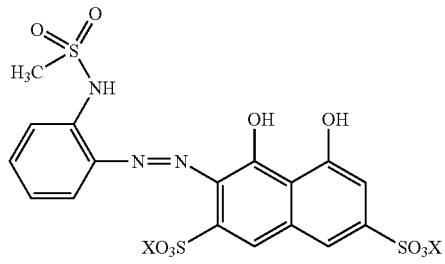
where X, a and n are each as defined above.
Particular preference is further given to disazo compounds of the formula (IIIa) and (IIIb)
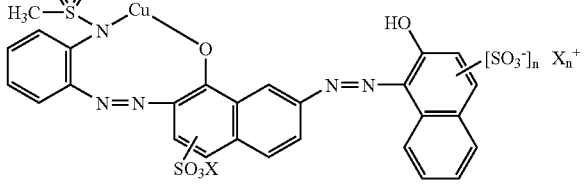
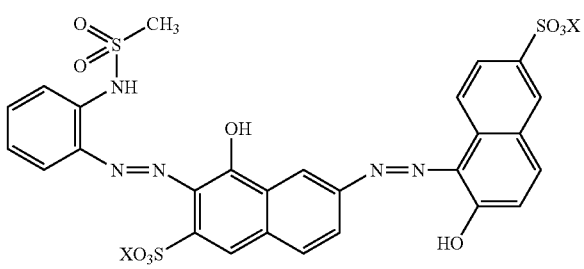
where X and n are each as defined above.
Particular preference is further given to trisazo compounds of the formula (IVa) and (IVb)
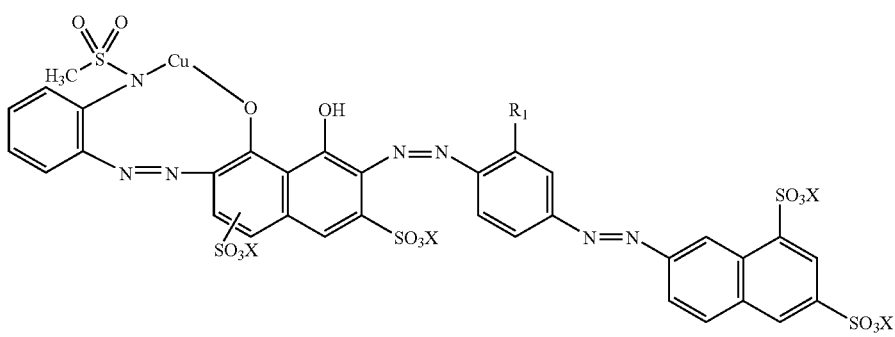

-continued

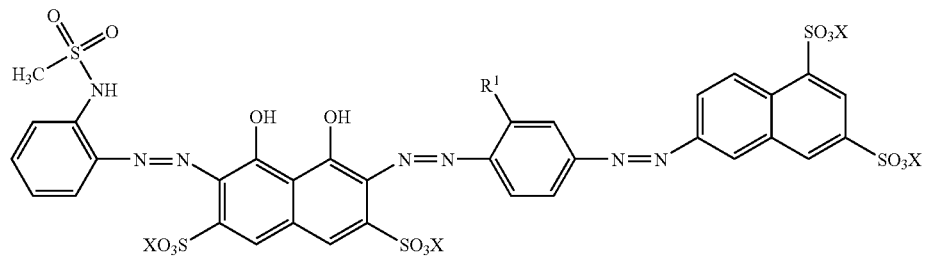

(IVb)

where R¹ and X are each as defined above.

The present invention further provides a process for preparing a compound of the formula (I) which comprises 2-di(methanesulfonyl)amidoaniline being diazotized, the resulting diazonium salt being coupled with a coupling component corresponding to ring system A, one of the two methanesulfonamide groups being detached and optionally the resulting azo compound being reacted with a Cu, Co, Ni, Mn, Zn or Al salt.

The 2-di(methanesulfonyl)amidoaniline starting compound can be prepared by reacting 2-nitroaniline with at least two equivalents of methanesulfonyl chloride in an excess of pyridine and then reducing the nitro group, for example with iron or tin in hydrochloric acid/ethanol.

The diazotization and coupling steps can be carried out according to customary methods.

The diazotization is preferably carried out in aqueous solution or suspension with sodium nitrite at temperatures from 0 to 10° C. and a pH between 1 and 3.

The azo coupling is preferably carried out in aqueous solution or suspension at temperatures from 0 to 20° C. and a pH between 3 and 9.

The molar ratios between the particular diazonium salt and the particular coupling component are preferably 1:(0.8 to 2).

The detaching of one of the two methanesulfonamide groups is accomplished selectively by heating in an aqueous alkaline medium, pH preferably 9 to 12, to about 60 to 80° C.

The complexing is advantageously accomplished by adding an aqueous metal salt solution, for example metal sulfate, metal chloride, metal bromide, metal hydrogensulfate, metal bicarbonate or metal carbonate, where metal is as defined above and more preferably is copper. Depending on the particular dye, the complexing can be carried out in both the acid and the alkaline range. The temperature should be between 60 and 130° C., and superatmospheric pressure is employed if necessary.

Disazo dyes according to the present invention can be prepared by initially preparing the corresponding, methanesulfonyl-containing monoazo dye as described above and then diazotizing the free amino group on the naphthyl radical of A before coupling. The disazo dye formed can then be complexed with a metal salt as described above.

Trisazo dyes according to the present invention can be prepared by initially preparing the corresponding disazo dye as described above and then diazotizing the free amino group on the phenyl radical D before coupling.

However, it is also possible for the methanesulfonyl-containing monoazo dye to be diazotized and coupled with an appropriate phenylazonaphthalenesulfonic acid salt or to couple the methanesulfonyl-containing monoazo dye with a diazotized phenylazonaphthalenesulfonic acid salt.

The trisazo dye formed can then be complexed with a metal salt as described above.

However, it is also possible to carry out the aforementioned synthetic variants with the already complexed monoazo dye instead of the monoazo dye.

To exchange the cations on the sulfo groups, the azo dye can be reacted with a solution of the corresponding salt, for example with a substituted ammonium salt.

The dyes according to the present invention can be isolated from the as-obtained, preferably aqueous, reaction mixtures by salting out, filtration or spray drying, with or without prior partial or complete desalting by means of membrane filtration. However, an isolating step can also be omitted and the reaction mixtures containing the dyes of the present invention converted directly into concentrated dye solutions by adding organic and/or inorganic bases and/or humectants with or without prior partial or complete desalting by means of membrane filtration. Alternatively, the complex dyes can also be used as press cakes (including in flushing processes, if desired) or as a powder. The dyes can be applied in the form of their aqueous solutions to an ionic exchange resin for further purification.

To achieve certain color shades, the dyes of the present invention can be shaded with a further colorant, preferably from the group of the colorants listed in the Colour Index such as for example C.I. Acid Yellow 17 and 23, C.I. Direct Yellow 86, 98 and 132, C.I. Reactive Yellow 37, C.I. Pigment Yellow 17, 74, 83, 97, 120, 139, 151, 155 and 180; C.I. Direct Red 1, 11, 37, 62, 75, 81, 87, 89, 95, 227; C.I. Acid Red 1, 8, 80, 81, 82, 87, 94, 115, 131, 144, 152, 154, 186, 245, 249 and 289; C.I. Reactive Red 21, 22, 23, 35, 63, 106, 107, 112, 113, 114, 126, 127, 128, 129, 130, 131, 137, 160, 161, 174, 180; C.I. Pigment Red 122, 176, 184, 185 and 269; C.I. Direct Blue 199, C.I. Acid Blue 9, C.I. Pigment Blue 15:1–15:4. The shading colorant is preferably added in an amount from 0.001 to 5% by weight and especially from 0.01 to 1% by weight, based on the dry weight of the dye of the present invention.

The dyes of the present invention can be mixed with the shading colorant by mixing the dyes of the formula (I) and the shading colorant in the stated blend ratios in the form of dry powders, their solutions, water- or solvent-moist press cakes and/or masterbatches with one another or shading inks prepared from the dyes.

The present invention also provides for the use of the (optionally shaded) dyes of the formula (I) for dyeing and printing natural and synthetic fiber materials such as for example polyester, silk, wool or blend fabrics, especially for recording script and images on various recording media and also for pulp coloring paper or celluloses.

When the dyes described are to be used in recording fluids, they are worked up appropriately to the stated requirements. The dyes can be isolated from the as-obtained, preferably aqueous, reaction mixtures by salting out and filtration or by spray drying, with or without prior partial or complete desalting by means of membrane filtration and/or ion exchange. However, an isolating step can also be omitted and the reaction mixtures containing the dyes converted directly into concentrated dye solutions by adding organic and/or inorganic bases, possibly humectants, preservatives and with or without prior partial or complete desalting by means of membrane filtration. Alternatively, the dyes can also be used as press cakes (including in flushing processes, if desired) or as a powder. Advantageously, the dyes of the present invention are used in a very pure and salt-free form, ie free of NaCl or other customary inorganic salts formed in the course of the synthesis of the dyes.

Useful inorganic bases for concentrated dye solutions include for example lithium hydroxide, lithium carbonate, sodium hydroxide, sodium bicarbonate, sodium carbonate, potassium hydroxide, potassium carbonate and ammonia. Useful organic bases include for example monoethanolamine, diethanolamine, triethanolamine, 2-aminopropanol, 3-aminopropanol, dipropanolamine, tripropanolamine, N-methylaminoethanol, N,N-dimethylaminoethanol, N-phenylaminopropanol, ethylenediamine, tetramethylethylenediamine, tetramethylpropylenediamine, tetramethylhexylenediamine, diethylenetriamine, triethylenetetramine, triethylamine, diisopropylethylamine and polyethyleneimine.

Useful humectants for concentrated dye solutions include for example formamide, urea, tetramethylurea, ε-caprolactam, ethylene glycol, diethylene glycol, triethylene glycol, polyethylene glycol, butylglycol, methylcellosolve, glycerol, N-methyl-pyrrolidone, 1,3-diethyl-2-imidazolidinone, sodium xylenesulfonate, sodium cumenesulfonate and sodium butylmonoglycol sulfate.

The dyes of the present invention are particularly useful for preparing recording fluids, especially aqueous and non-aqueous inks for the inkjet printing process, and also for such inks as work by the hot-melt process or are based on microemulsions, but also for other printing, duplicating, marking, writing, drawing, stamping or registering processes.

The present invention also provides recording fluids comprising one or more dyes of the present invention with or without other colorants for shading, as described above. Such shading colorants are included in an amount which is advantageously in the range from 0 to 20% by weight, preferably in the range from 0.01 to 10% by weight and especially in the range from 0.1 to 5% by weight, based on the total weight of the recording fluid.

The composition of the recording fluid has to be adapted to the intended purpose.

Recording fluids of the present invention include in general a total of 0.1 to 50% by weight of the dye of the formula (I) including the possible shading colorant, reckoned as dry weight, 0 to 99% by weight of water and 0.5 to 99.5% by weight of organic solvent and/or humectant. In a preferred embodiment, the recording fluids include 0.5 to 15% by weight of the stated dye, reckoned as dry weight, 35 to 75% by weight of water and 10 to 50% by weight of organic solvent and/or humectant; in another preferred embodiment, 0.5 to 15% by weight of the stated dye, reckoned as dry weight, 0 to 20% by weight of water and 70 to 99.5% by weight of organic solvent and/or humectant.

Water used for preparing the dyes (I) and the recording fluids containing them is preferably used in the form of distilled or demineralized water.

The solvents and/or humectants included in the recording fluids can be an organic solvent or a mixture of such solvents, in which case water-miscible solvents are preferred. Useful solvents include for example mono- or polyhydric alcohols, their ethers and esters, for example methanol, ethanol, propanol, isopropanol, butanol, isobutanol; di- or trihydric alcohols, especially of 2 to 6 carbon atoms, for example ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, for example ethylene glycol monomethyl, monoethyl or monobutyl ether, triethylene glycol monomethyl or monoethyl ether; ketones and ketone alcohols such as for example, acetone, methyl ethyl ketone, diethyl ketone, methyl isobutyl ketone, methyl pentyl ketone, cyclopentanone, cyclohexanone, diacetone alcohol; amides, for example, dimethylformamide, dimethylacetamide, N-methylpyrrolidone; also urea, tetramethylurea, thiodiglycol, ε-caprolactam.

The recording fluids of the present invention can further include customary additives, for example preservatives, cationic, anionic or nonionic surface-active substances (surfactants and wetting agents) and also viscosity regulators, for example polyvinyl alcohol, cellulose derivatives, or water-soluble natural or artificial resins as film formers or binders to enhance the adhesiveness and abrasion resistance. Light protectants, optical brighteners, oxidizing agents, reducing agents and free-radical scavengers are further possible includables.

Amines, for example ethanolamine, diethanolamine, triethanolamine, N,N-dimethyl-ethanolamine, diisopropylamine, N-ethyldiisopropylamine can be included to raise the pH of the recording fluid. They are normally present in the recording fluid at 0 to 10% by weight, and preferably 0.5 to 5% by weight, based on the total weight of the recording fluid.

The recording fluids for the inkjet printing process can include further additives depending on the embodiment of this printing process, for example whether it is a Continuous Jet, Intermittent Jet, Impulse Jet or Compound Jet process, for example to buffer the pH, to adjust the electrical conductivity, to adjust the specific heat capacity, to adjust the thermal expansion coefficient and to adjust the conductivity.

The recording fluids of the present invention are in terms of viscosity and surface tension in the ranges suitable for the inkjet process. They provide printed images of high optical density and excellent lightfastness and waterfastness.

The dyes of the present invention can further be used as an ink set in combination with black, yellow, magenta, cyan, optionally green and optionally orange colorants. Preference is here given to a set of printing inks whose black formulation contains a carbon black, especially a gas or furnace black, as a colorant, such as for example C.I. Reactive Black 8, C.I. Reactive Black 31, C.I. Direct Black 168, C.I. Sol. Sulfur Black 1 and 2, C.I. Acid Black 194; whose cyan formulation contains the dyes C.I. Acid Blue 9, C.I. Direct Blue 199, or a pigment of the group of the phthalocyanine, indanthrone or triarylcarbonium pigments, especially the Colour Index pigments Pigment Blue 15, Pigment Blue 15:1, Pigment Blue 15:2, Pigment Blue 15:3, Pigment Blue 15:4, Pigment Blue 16, Pigment Blue 56, Pigment Blue 60 or Pigment Blue 61; whose magenta formulation contains the dyes C.I. Reactive Red 23, C.I. Reactive Red 180, C.I. Acid Red 52, or a pigment of the group of the monoazo, disazo, β-naphthol, Naphthol AS, laked azo, metal complex, benzimidazolone, anthanthrone, anthraquinone, quinacridone, dioxazine, perylene, thioindigo, triarylcarbonium or diketopyrrolopyrrole pigments, especially the Colour Index pigments Pigment Red 2, Pigment Red 3, Pigment Red 4, Pigment Red 5, Pigment Red 9, Pigment Red 12, Pigment Red 14, Pigment Red 38, Pigment Red 48:2, Pigment Red 48:3, Pigment Red 48:4, Pigment Red 53:1, Pigment Red 57:1, Pigment Red 112, Pigment Red 122, Pigment Red 144, Pigment Red 146, Pigment Red 147, Pigment Red 149, Pigment Red 168, Pigment Red 169, Pigment Red 170, Pigment Red 175, Pigment Red 176, Pigment Red 177, Pigment Red 179, Pigment Red 181, Pigment Red 184, Pigment Red 185, Pigment Red 187, Pigment Red 188, Pigment Red 207, Pigment Red 208, Pigment Red 209, Pigment Red 210, Pigment Red 214, Pigment Red 242, Pigment Red 247, Pigment Red 253, Pigment Red 254, Pigment Red 256, Pigment Red 257, Pigment Red 262, Pigment Red 263, Pigment Red 266, Pigment Red 269, Pigment Red 274, Pigment Violet 19, Pigment Violet 23 or Pigment Violet 32; whose yellow formulation preferably contains the dye C.I. Acid Yellow 17, C.I. Acid Yellow 23, C.I. Direct Yellow 86, C.I. Direct Yellow 98, C.I. Direct Yellow 132, C.I. Reactive Yellow 37, or a pigment of the group of the monoazo, disazo, benzimidazoline, isoindolinone, isoindoline or perinone pigments, especially the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 120, Pigment Yellow 126, Pigment Yellow 127, Pigment Yellow 128, Pigment Yellow 139, Pigment Yellow 151, Pigment Yellow 154, Pigment Yellow 155, Pigment Yellow 173, Pigment Yellow 174, Pigment Yellow 175, Pigment Yellow 176, Pigment Yellow 180, Pigment Yellow 181, Pigment Yellow 191, Pigment Yellow 194, Pigment Yellow 196 or Pigment Yellow 213; whose orange formulation preferably contains a pigment of the group of the disazo, β-naphthol, Naphthol AS, benzimidazolone or perinone pigments, especially the Colour Index pigments Pigment Orange 5, Pigment Orange 13, Pigment Orange 34, Pigment Orange 36, Pigment Orange 38, Pigment Orange 43, Pigment Orange 62, Pigment Orange 68, Pigment Orange 70, Pigment Orange 72 or Pigment Orange 74; whose green formulation preferably contains a pigment of the group of the phthalocyanine pigments, especially the Colour Index pigments Pigment Green 7 or Pigment Green 36.

The dye mixtures of the present invention are further useful as colorants in electrophotographic toners and developers, for example one component and two component powder toners, magnetic toners, liquid toners, polymerization toners and also other specialty toners.

Typical toner binders are addition polymerization, polyaddition and polycondensation resins, such as styrene, styrene-acrylate, styrene-butadiene, acrylate, polyester, phenolic epoxy resins, polysulfones, polyurethanes, individually or in combination, also polyethylene and polypropylene, which each can include further ingredients such as charge control agents, waxes or flow agents, or are subsequently modified with these additives.

The dye mixtures of the present invention are further useful as colorants in powders and powder coatings, especially in triboelectrically or electrostatically sprayed powder coatings used for surface coating of objects composed for example of metal, wood, plastic, glass, ceramic, concrete, textile material, paper or rubber.

Powder coating resins are typically epoxy resins, carboxyl- and hydroxyl-containing polyester resins, polyurethane and acrylic resins together with customary curing agents. Combinations of resins are also used. For instance, epoxy resins are frequently used in combination with carboxyl- and hydroxyl-containing polyester resins.

The dyes of the present invention are also useful as colorants for color filters, not only for additive but also for subtractive color generation, and also as colorants in Electronic Inks for Electronic Newspapers and in the medical sector.

The azo dyes of the present invention are further useful as colorants in printing inks, lacquers, paints, artists' colors, plastics, rubber materials, office articles, wood coatings and cleaners. Typical printing inks are for example offset printing inks, illustration gravure inks and printing inks for aqueous and solventborne packaging printing and for flexographic printing. Typical paints are automotive OEM and refinish paints, industrial paints and architectural paints (eg polymeric renders or emulsion paints). Typical plastics colorations are those for example in plasticized and unplasticized PVC (polyvinyl chloride), polyolefins or polystyrenes.

The dyes of the present invention can further be used for the surface coating of objects composed for example of metal, wood, plastics, glass, ceramic, concrete, textile material, paper and rubber.

In the above-described areas of application, too, the dyes of the present invention can be additionally shaded with the above-recited dyes and/or pigments.

In the examples which follow, parts are by weight. In the formulae hereinbelow, acidic hydrogen atoms can be wholly or partly replaced by $Na^+$ or $K^+$, depending on the pH, and vice versa.

EXAMPLE 1 a) Diazotization and Coupling:

5.3 parts of 2-di(methanesulfonyl)amidoaniline were stirred into a mixture of 25 parts of water and 5.9 parts of 30% by weight hydrochloric acid. After addition of 10 parts of ice the amine was diazotized by addition of 5 parts by volume of 4N sodium nitrite solution. This was followed by 2 hours of stirring at 5° C. before the excess nitrite was destroyed with sulfamic acid.

The suspension formed was subsequently added dropwise to a solution of 8.4 parts of 1,8-dihydroxynaphthalene-3,6-disulfonic acid (disodium salt) in 30 parts of water. The mixture formed was stirred at room temperature for 2 hours, before the voluminous red precipitate of the monoazo dye was filtered off and dried.

b) Demesylation and Complexing with Cu:

19.5 parts of the monoazo dye of a) were dissolved in 75 parts of water and 9.6 parts of 30% by weight aqueous sodium hydroxide solution. The solution was heated at 60° C. for 1 hour and then admixed with 5.4 parts of sodium acetate. After heating to 80° C. 5 parts of copper (II) sulfate hydrate were added a little at a time over 1 hour, a dark red solution of the monoazo copper complex dye of the formula

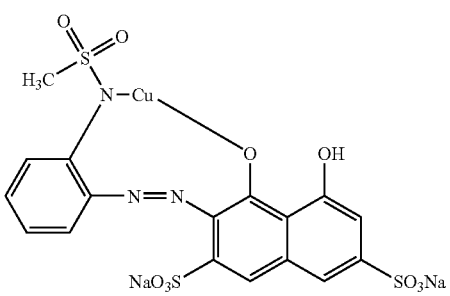

being produced. After cooling to room temperature, the dye solution was filtered through a 0.1–0.3 μm filter and subsequently desalted by a membrane desalting system.

EXAMPLE 2

90 parts of a monoazo copper complex dye solution of example 1 were mixed with 35 parts of a solution of 7.4 parts of a $C_{12}$–$C_{14}$-alkylamine in 20 parts of water and 4.8 parts of 30% hydrochloric acid. The precipitate formed was stirred for 1 hour and filtered off and the residue was washed salt-free with deionized water, washed and dried to leave 15 parts of a compound of the formula

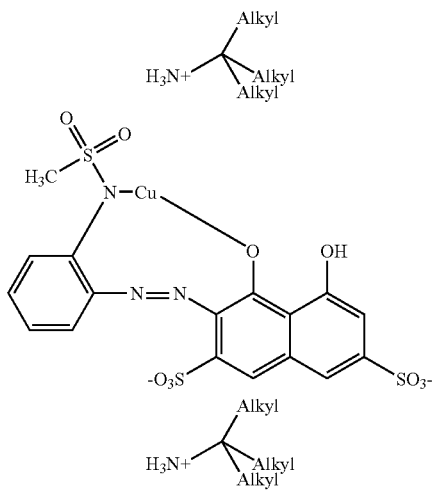

where "Alkyl" is $C_{12}$–$C_{14}$-alkyl at each instance.

EXAMPLE 3 a) Diazotization and Coupling to the Monoazo Dye:

11.5 parts of 2-di(methanesulfonyl)amidoaniline were stirred into a mixture of 50 parts of water and 12 parts of 30% by weight hydrochloric acid. After addition of 30 parts of ice the amine was diazotized by addition of 10 parts by volume of 4N sodium nitrite solution. This was followed by 2 hours of stirring at 5° C. before the excess nitrite was destroyed with sulfamic acid.

The suspension formed was subsequently added dropwise to a solution of 10.4 parts of 2-amino-8-hydroxynaphthalene-6-sulfonic acid in 100 parts of water and 10.8 parts by weight of aqueous sodium hydroxide solution. A pH of 8.5 to 9.0 was set by simultaneous addition of 8 parts of sodium carbonate. The mixture formed was stirred at room temperature for 3 hours, filtered off and dried.

b) Diazotization and Coupling to the Disazo Dye:

18.8 parts of the monoazo dye of a) were stirred into a mixture of 200 parts of water and 29 parts of 30% by weight hydrochloric acid. After addition of 50 parts of ice the amine was diazotized by addition of 8 parts by volume of 4N sodium nitrite solution. This was followed by 2 hours of stirring at 5° C. before the excess nitrite was destroyed with sulfamic acid.

The suspension formed was subsequently added dropwise to a solution of 8.5 parts of 2-hydroxynaphthalene-6-sulfonic acid in 55 parts of water and 3.7 parts of 30% by weight aqueous sodium hydroxide solution. A pH of 8.5 to 9.0 was set by simultaneous addition of 32 parts of 30% by weight aqueous sodium hydroxide solution. The dark violet mixture formed was stirred at room temperature for 3 hours. The disazo dye formed was filtered off and dried.

c) Demesylation and Complexing with Cu:

16.8 parts of the disazo dye of b) were stirred into 50 parts of water and 1.5 parts of 30% by weight aqueous sodium hydroxide solution. The mixture was heated at 60° C. for 1 hour and then admixed with 1.5 parts of sodium acetate. After heating to 98° C. 1.8 parts of copper (II) sulfate hydrate in 10 parts of water were added. The reaction mixture was refluxed for 6 hours, a violet solution of the disazo copper complex dye of the formula

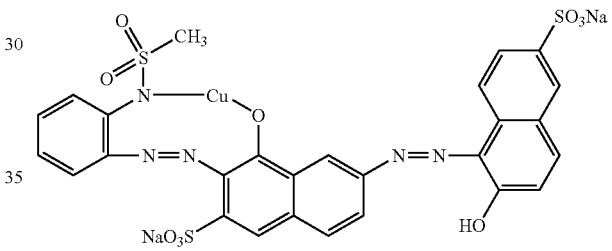

being formed. After cooling to room temperature the dye solution was filtered through a 0.1–0.3 μm filter and subsequently desalted by a membrane desalting system.

EXAMPLE 4

67 parts of a disazo copper complex dye solution of example 3 were mixed with 13 parts of a solution of 2.7 parts of a $C_{12}$–$C_{14}$-alkylamine in 7 parts of water and 1.8 parts of 30% hydrochloric acid. The precipitate formed was stirred for 1 hour and filtered off and the residue was washed salt-free with deionized water, washed and dried to leave 7.2 parts of a compound of the formula

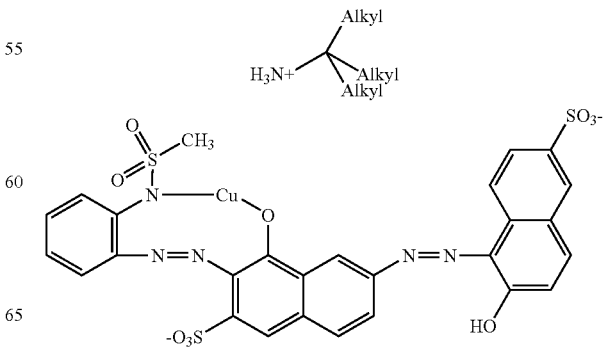

-continued

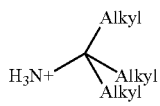

where "Alkyl" is $C_{12}$–$C_{14}$-alkyl at each instance.

EXAMPLE 5

9.7 parts of 2-[(4-amino-3-methoxyphenyl)azo]naphthalene-6,8-disulfonic acid disodium salt (CAS No. 65151-26-0) were stirred into a mixture of 120 parts of water and 5.7 parts of 30% by weight hydrochloric acid. After addition of 50 parts of ice the amine was diazotized by addition of 5.2 parts by volume of 4N sodium nitrite solution. This was followed by 1 hour of stirring at 5° C. before the excess nitrite was destroyed with sulfamic acid. The orange solution was gradually added to a solution of 12.5 parts of the monoazo copper complex dye of example 1b). A pH of 4.3 to 4.5 was set by simultaneous addition of 5 parts of sodium acetate. The mixture formed was stirred at room temperature for 3 hours, a black solution of the trisazo copper complex dye of the formula

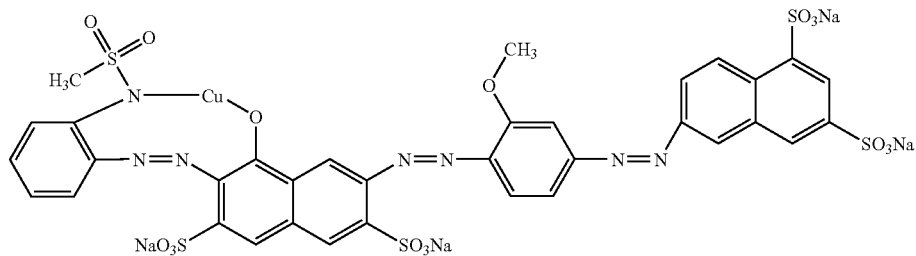

being formed. After cooling to room temperature the dye solution was filtered through a 0.1–0.3 μm filter and subsequently desalted by a membrane desalting system.

EXAMPLE 6

200 parts of a trisazo copper complex dye solution of example 5 were admixed with 60 parts of a solution of 10.3 parts of 2-ethylhexylamine in 40 parts of water and 9.4 parts of 30% by weight hydrochloric acid. The black precipitate formed was stirred for 1 hour and filtered off and the residue was washed salt-free with deionized water and dried to leave 25 parts of a compound of the formula

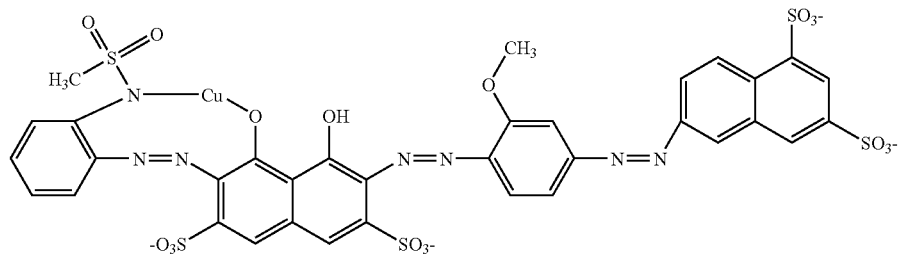
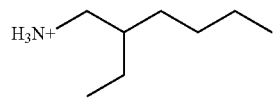

4

EXAMPLE 7

Example 1 was repeated without the addition of copper salt to prepare the compound of the following formula:

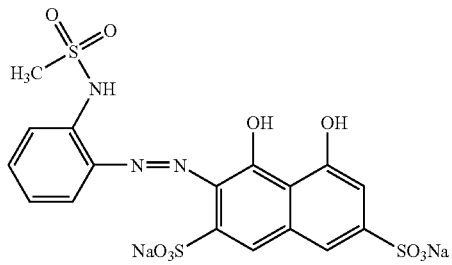

EXAMPLE 8

Example 3 was repeated without the addition of copper salt to prepare the compound of the following formula:

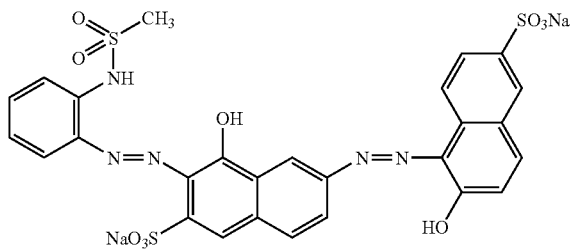

EXAMPLE 9

Example 5 was repeated without the addition of copper salt to prepare the compound of the following formula:

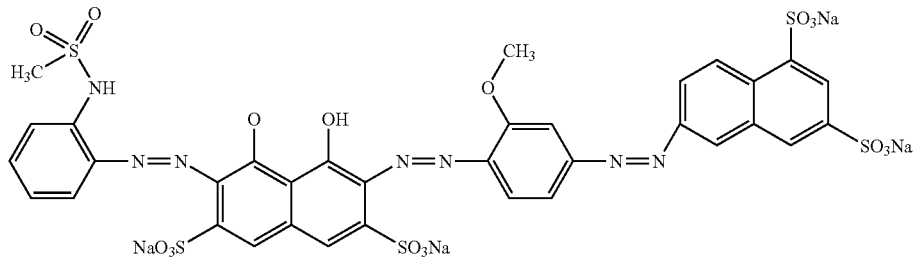

EXAMPLE 10

Preparation of a Recording Fluid 2.5 g of pure dye as per example 1 were added to a mixture of 20.0 g of diethylene glycol, 1.0 g of triethanolamine, 1.0 g of urea and 78.0 g of demineralized water, and dissolved therein, at 25° C. by stirring.

The inks thus prepared provide magenta-colored prints having very good lightfastness.

Inkjet inks were prepared in similar fashion using the pure dyes of examples 2 to 9.

The prepared recording fluids were stored at 60° C. for 4 weeks to test their storage stability. After 4 weeks at 60° C. no precipitates had formed and the recording fluids were filterable through very fine filters without leaving a residue. Colorimetric examinations reveal no differences to the performance tests carried out for the storage stability tests.

The invention claimed is:

1. A compound of the general formula (I)

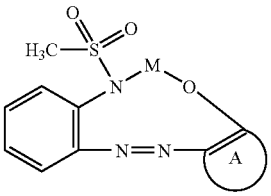

wherein

M is two hydrogen atoms or one metal ion selected from the group consisting of Cu, Co, Ni, Mn, Zn and Al;

A is

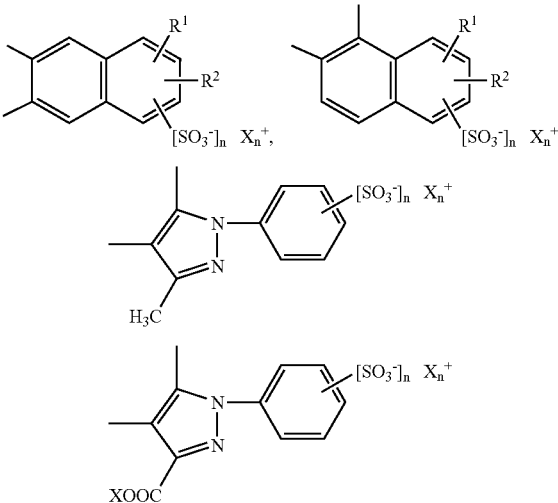

$R^1$ is H, OH or $-NH-(CH_2)_a-SO_3^-X^+$ where a is from 1 to 6;

$R^2$ is H or a radical of the formulae

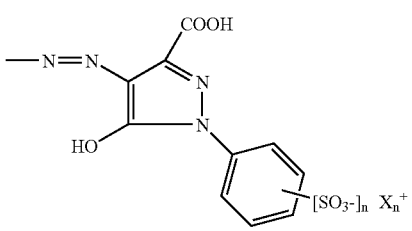

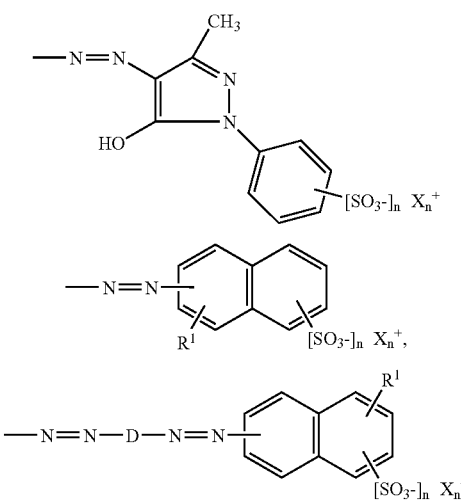
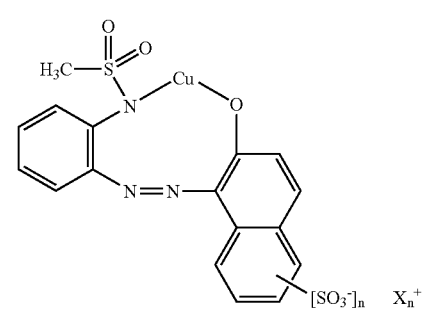
D is $C_6H_4$, $C_6H_3(OH)$ or $C_6H_3(OCH_3)$;
X is H, alkali metal, $NH_4$, $C_1$–$C_{18}$-alkyl-$NH_3$, $(C_1$–$C_{18}$-alkyl$)_2NH_2$, $(C_1$–$C_{18}$-alkyl$)_3NH$, $(C_1$–$C_{18}$-alkyl$)_3CNH_3$, $(C_1$–$C_{18}$-alkyl$)_2CHNH_3$, or $(C_1$–$C_{18}$-alkyl$)_4N$, and
n is from 1 to 4.
2. A compound as claimed in claim 1, of the formulae (IIa) to (IIf)
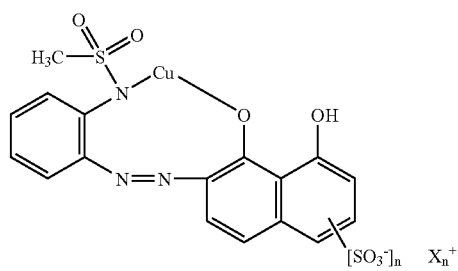
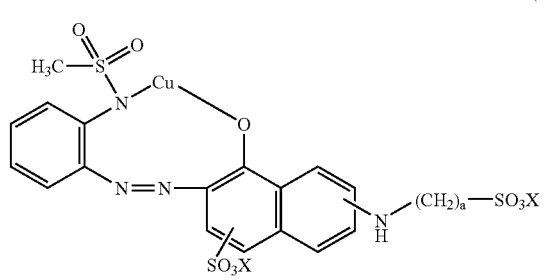
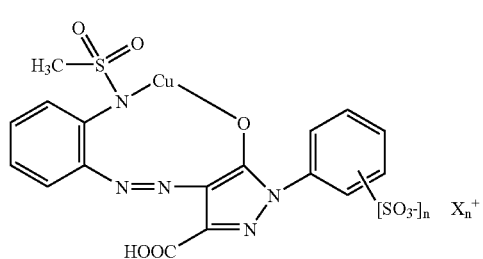
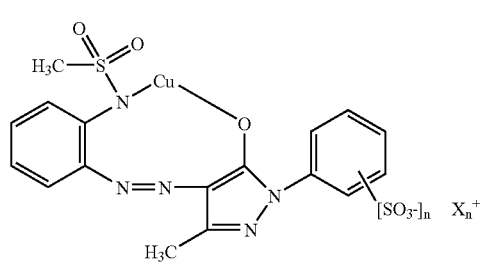
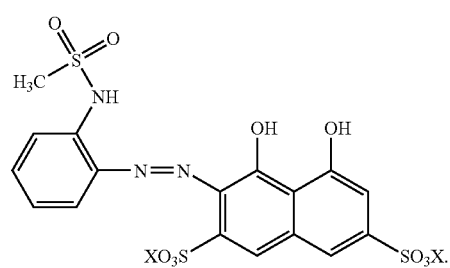
3. A compound as claimed in claim 1, of the formulae (IIIa) or (IIIb)
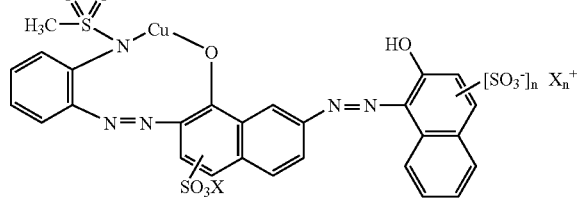
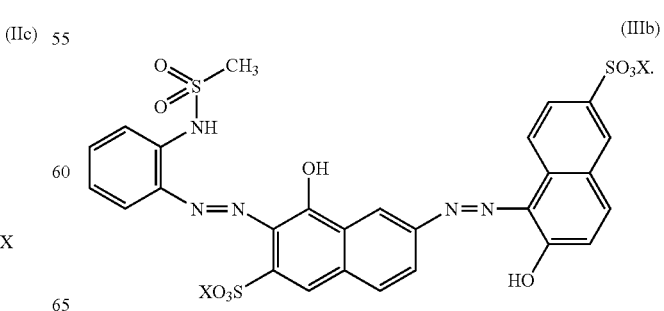

4. A compound as claimed in claim 1, of the formula (IVa) or (IVb)

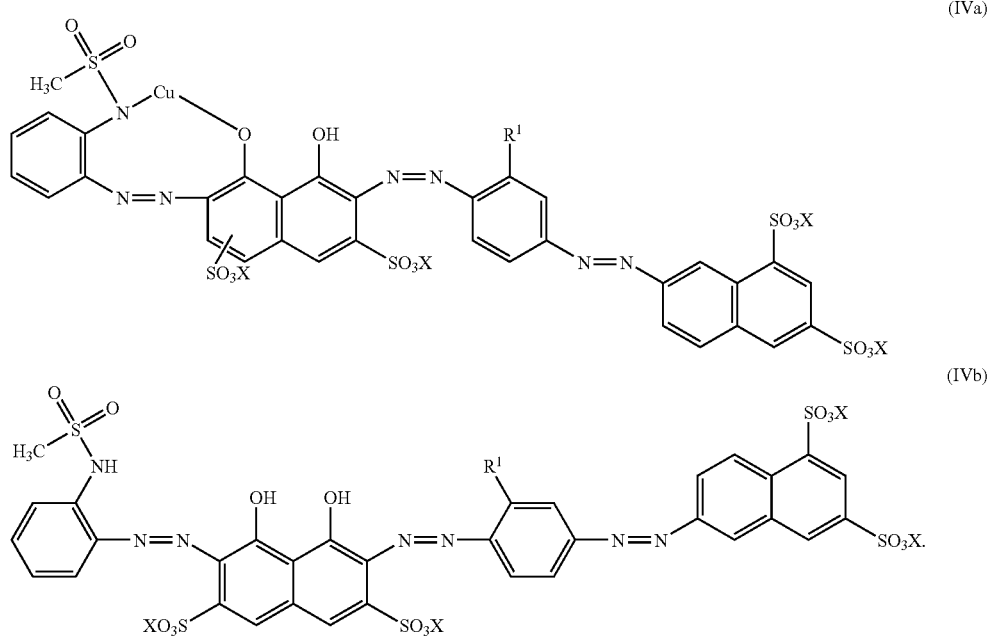

5. A process for preparing a compound as claimed in claim 1, comprising the steps of diazotizing a 2-di(methanesulfonyl)amidoaniline to form a diazonium salt, coupling the diazonium salt with a coupling component corresponding to ring system A, and detaching one of the two methanesulfonamide groups to form the azo compound.

6. An article colored by a compound as claimed in claim 1, wherein the article is selected from the group consisting of natural or synthetic fiber materials, recording media, paper, cellulosic materials, printing inks, lacquers, paints, plastics, rubber materials, office articles, wood coatings, wood cleaners and artists' colors.

7. A colorant for inkjet inks or electrophotographic toners comprising a compound as claimed in claim 1.

8. A recording fluid comprising 0.1 to 50% by weight of at least one compound as claimed in claim 1.

9. An ink set comprising a recording fluid as claimed in claim 8.

10. The process as claimed in claim 5, further comprising the step of reacting the azo compound with a Cu, Co, Ni, Mn, Zn or Al salt.

11. The recording fluid as claimed in claim 8, further comprising 0 to 99% by weight of water and 0.5 to 99.5% by weight of at least one of an organic solvent and humectant.

12. The ink set as claimed in claim 9, further comprising the colors black, yellow, cyan and magenta.

13. The ink set as claimed in claim 9, further comprising the color orange.

14. The ink set as claimed in claim 9, further comprising the color green.

* * * * *